United States Patent [19]

Kohler

[11] Patent Number: 5,615,312
[45] Date of Patent: Mar. 25, 1997

[54] COLOR MANAGEMENT SYSTEM HAVING BUSINESS GRAPHICS RENDERING MODE

[75] Inventor: Timothy L. Kohler, Mountain View, Calif.

[73] Assignee: Canon Information Systems, Inc., Costa Mesa, Calif.

[21] Appl. No.: 496,100

[22] Filed: Jun. 28, 1995

[51] Int. Cl.⁶ .......................... G06K 15/00; H04N 1/46; B41J 27/16
[52] U.S. Cl. .......................... 395/109; 358/520; 358/518
[58] Field of Search .................... 395/109, 101, 395/131; 358/520, 518, 504, 515; 347/19; 355/246; H04N 1/46; B41J 27/18, 27/16, 27/14

[56] References Cited

U.S. PATENT DOCUMENTS

| | | | |
|---|---|---|---|
| 4,668,979 | 5/1987 | Jüng | 358/520 |
| 4,831,434 | 5/1989 | Fuchsberger | 358/520 |
| 5,239,370 | 8/1993 | Yamaguchi | 358/518 |
| 5,243,414 | 9/1993 | Dalrymple et al. | 358/500 |
| 5,333,243 | 7/1994 | Best et al. | 395/109 |
| 5,335,097 | 8/1994 | Murakami | 358/518 |
| 5,357,354 | 10/1994 | Matsunawa et al. | 358/518 |
| 5,384,901 | 1/1995 | Glassner et al. | 395/131 |
| 5,394,518 | 2/1995 | Friedman et al. | 395/131 |
| 5,416,890 | 5/1995 | Beretta | 395/131 |

OTHER PUBLICATIONS

"InterColor Profile Format", version 3.0, Jun. 10, 1994, InterColor Consortium.

Primary Examiner—Edward L. Coles, Sr.
Assistant Examiner—Tracy M. Legree
Attorney, Agent, or Firm—Fitzpatrick, Cella, Harper & Scinto

[57] ABSTRACT

A business graphics rendering technique for rendering colors in color images more vividly. The business graphics rendering technique determines, for each color in a color image, whether the color is a chromatic color or an achromatic neutral color. For a chromatic color, color contrast is increased by increasing ink amounts for high-value ink amount colors and/or decreasing ink amounts for low-value ink amount colors. For an achromatic neutral color, ink amounts are left essentially unaltered.

22 Claims, 14 Drawing Sheets

COLOR MANAGEMENT SYSTEM

COLOR MANAGEMENT SYSTEM HAVING BUSINESS GRAPHICS RENDERING MODE

BACKGROUND OF THE INVENTION

1. Field of the Invention

The present invention pertains to a color management system which includes a business graphics rendering mode by which print images are rendered with a bright and vivid result. More specifically, in the business graphics rendering mode, overall color contrast of printed images is increased, while the achromatic contrast of the image is left essentially unaltered.

2. Description of the Related Art

Recently, as the availability of color monitors and color printers has increased, it is more and more commonplace for a computer user to display a full color image on a color monitor, such as by using desktop publishing software to display business graphics, photographic images, and the like, and then to request a full color printout of the displayed image.

However, color printers and color monitors form color images differently. Specifically, a color monitor is a light emitting device; colors are formed on color monitors by additive light processing in which light from three color primaries, generally red, green and blue, are added. Printed images, on the other hand, simply reflect ambient light; colors are formed by subtractive light processing according to the way ambient light is affected by three subtractive primaries, generally cyan, magenta and yellow (and sometimes black).

Additive light processing and subtractive light processing are fundamentally different. As a result, the range of colors displayable on a monitor is different from the range of colors printable by a printer. FIG. 1 is the CIE 1931 chromaticity diagram showing the range (or "gamut") of colors displayable by a monitor (area "A") and the range (or "gamut") of colors printable by a printer (area "B"). As seen in FIG. 1, the range of colors displayable on a monitor is generally greater than the range of colors printable by a printer. This is because a monitor is a light emitting device which uses color primaries that differ from those of a printer, and thus has a larger range of reproducible colors. There are, however, some colors such as at area 10 where a printed image, which uses light-subtractive primaries, can reproduce colors that a monitor cannot.

Because of the difference between the gamuts of printable and displayable colors, it has heretofore been difficult to print color images which are perceived by a viewer as faithful reproductions of color images displayed on a monitor. Specifically, it is simply not possible to print a color in areas like out-of-gamut area 11 which are outside the range "B" of printable colors. Accordingly, even though those colors may be seen on color monitors, they cannot be printed on a color printer.

To complicate an already complicated situation, what a viewer perceives as a faithful printed reproduction of displayed image often varies based on the nature of the printed matter. For example, in a situation where photographs or the like are printed, overall image quality and naturally-varying colors are more important than an exact colorimetric match between displayed and printed colors. Similarly, in situations where color uniformity is required such as in reproduction of corporate logos and the like, accurate colorimetric reproduction is more important than other factors. And, in the case of business graphics such as pie charts and bar graphs and the like, vividness of color—particularly fully-saturated colors like the red, green and blue colors indicted respectively at 12, 13 and 14 in FIG. 1—is more important than accurate color reproduction.

Because of these factors, not only is accurate color impossible due to the differences between the range of printable and displayable colors, but even good color reproduction is difficult since what is "good" in one situation such as photographic images is not "good" in other situations such as business graphics.

The Intercolor Consortium, which is a group of operating system and color peripheral manufacturers, have issued an "Intercolor Profile Format", Version 3.0 of which, dated Jun. 10, 1994, is specifically incorporated into the subject application. The Intercolor Consortium has attempted to address the foregoing three different situations by defining the need for three different rendering techniques to deal with each of the above-mentioned three different situations. According to the Intercolor Consortium, a "perceptual" color rendering technique is to be used when good overall image quality is desired, such as in photographs; a "colorimetric" rendering technique is to be used when accurate color reproduction is desired, such as in corporate logos or paint chips or the like; and a "saturation" color rendering technique is to be used when color saturation is important, such as in business graphics with pie charts and bar graphs. Various color rendering techniques have since been proposed, each in accordance with "perceptual", "colorimetric", and "saturation" needs, but problems still remain.

Specifically, in a "saturation" color rendering technique, which is hereafter referred to as a "business graphics rendering technique" because of its widespread use in connection with business graphics, in order to increase color saturation, it has been considered simply to increase ink (or toner) amounts for heavily-inked areas, and also to decrease ink (or toner) amount in lightly-inked areas, so as to increase overall contrast of printed images. For chromatic regions of an image, this simple technique results in a more vivid image. However, in achromatic neutrally colored areas of an image, such as in a gray-scale image, such techniques have an undesirable property of completely blackening dark gray areas of the image while completely whitening light gray areas of the image. Accordingly, a need exists for a business graphics rendering mode which provides increased color contrast for business graphics application, while leaving essentially unaltered achromatic neutrally-colored areas of the image.

SUMMARY OF THE INVENTION

The present invention addresses the above-noted needs by providing a business graphics rendering mode in which overall color contrast of chromatic regions of an image is increased, while contrast for achromatic neutrally-colored regions is left essentially unaltered, thereby providing for business graphics with a bright and vivid appearance while at the same time avoiding undesirable changes in appearance for gray-scale regions of business graphics.

According to one aspect of the invention, a business graphics rendering technique which increases overall color contrast analyzes each of the colors in an image to be printed. For chromatic colors, the business graphics rendering technique increases ink amounts for high value ink amounts and/or decreases ink amounts for low value ink amounts. For achromatic neutral colors, the business graphics rendering techniques leaves the ink amounts essentially unaltered. Preferably, when increasing and/or decreasing ink amounts, each ink component used by the printer is analyzed independently of other ink components so that there is no need to alter one ink amount based on the value of another ink amount. Likewise, a determination of whether a printed color is chromatic or achromatic can be made by transformation of the printed colors to an appropriate color space where color saturation can be analyzed easily; alternatively, it is possible to determine whether a color is chromatic or achromatic by comparing each of the three ink values.

In connection with the invention, it is understood that the word "ink" is used to refer generically to colorants used by a color printer, whether those colorants be inks, toners, thermal wax transfers, ribbons, or the like.

In its most preferred embodiment, a business graphics rendering technique according to the invention is incorporated into a color management system which provides a user with three different alternatives for color rendering: perceptual rendering, colorimetric rendering, and business graphics rendering. For perceptual and colorimetric rendering, appropriate look-up tables are used to determine ink amounts, this being done in order to reduce processing overhead which would otherwise be caused by the large amount of different colors ordinarily present in a typical printed image. On the other hand, for the business graphics rendering technique, since business graphics are ordinarily composed of only a few different colors (for example, in a seven-way-divided pie chart, only seven different colors would ordinarily be needed), look-up tables need not be employed to obtain ink amounts, but rather deterministic processing is preferably used to determine ink amounts. This arrangement permits the color management system according to the invention to reduce the amount of memory which otherwise would be needed by providing a look-up table for the business graphics rendering mode.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
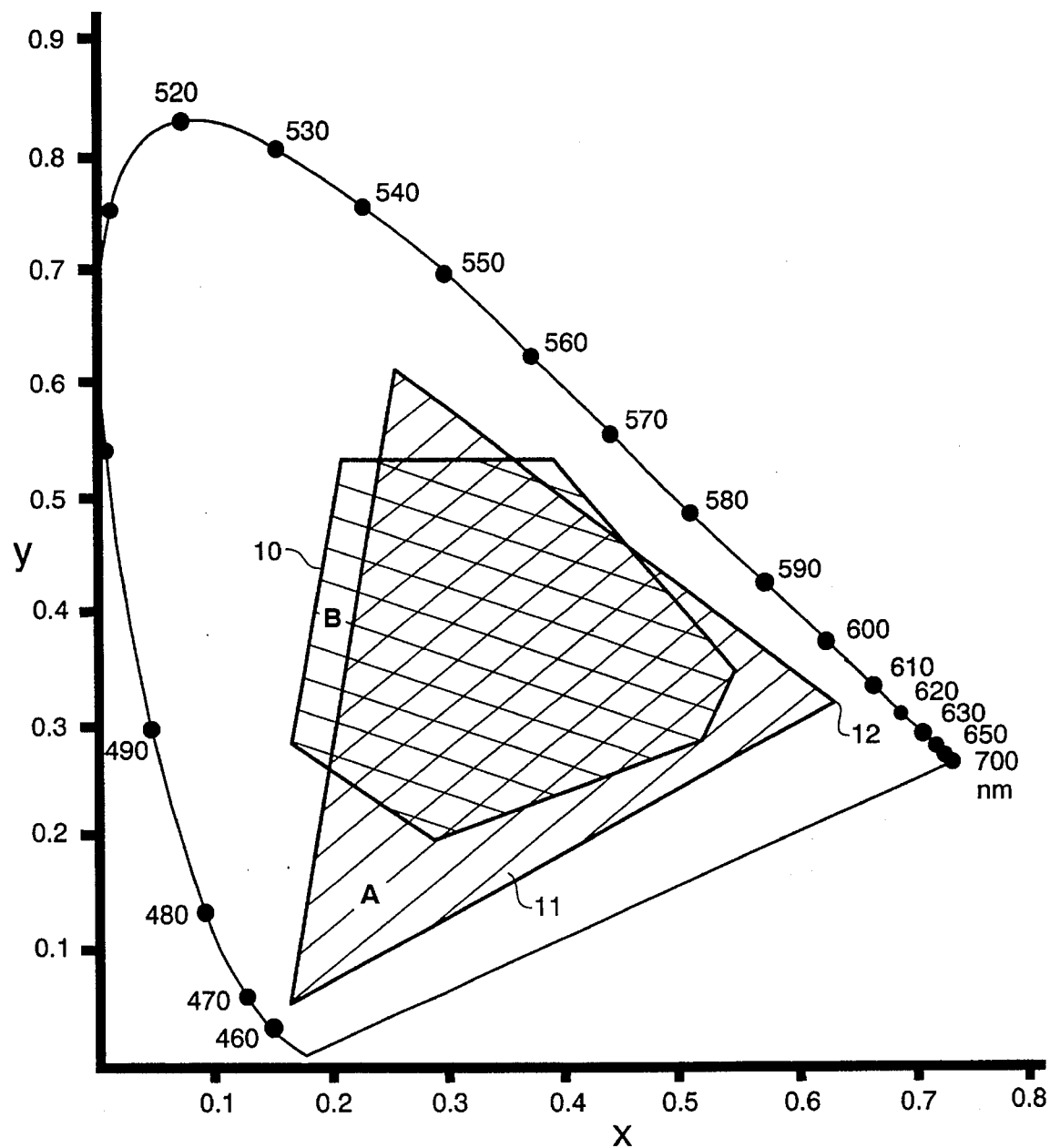
FIG. 1 is a chromaticity diagram showing how the gamut of colors printable on a printer is related to the gamut of colors displayable on a monitor.
Figure 2:
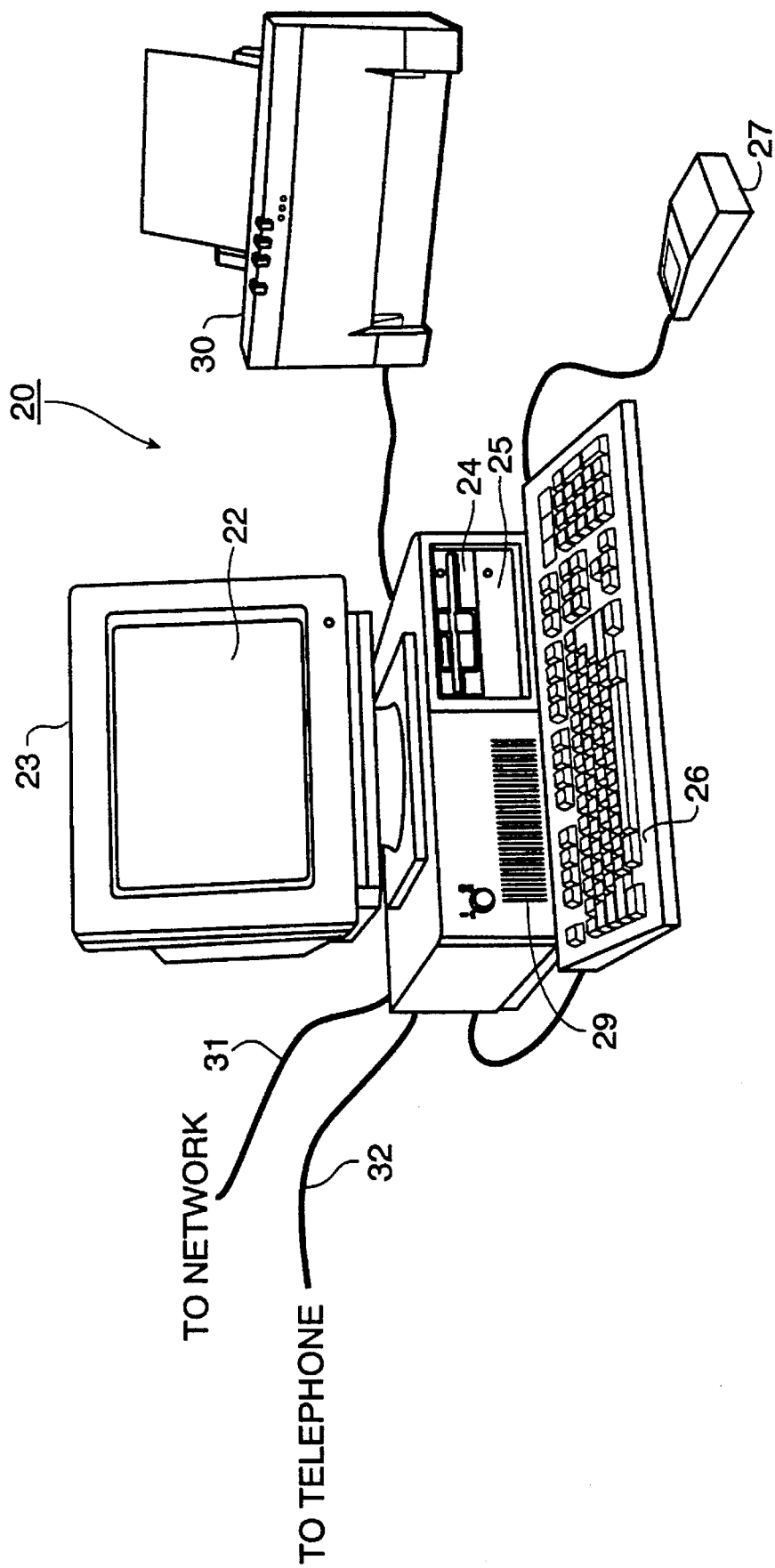
FIG. 2 is a view showing the outward appearance of representative computing equipment which incorporates a color management system with business graphics mode according to the invention.

FIG. 2 is a view showing the outward appearance of representative computing equipment which incorporates a color management system according to the invention. Shown in FIG. 2 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, a pointing device 27 such as a mouse or the like which is also provided to permit manipulation of objects on display screen 22, and a combined speaker/microphone 29. A conventional color printer 30, such as a color bubble jet printer, is also provided. Also provided are connections to a network 31 or to an ordinary voice telephone line 32 for sending and receiving color image data, voice and/or facsimile messages, and other data files.

While a bubble jet printer is presently preferred, any color printer which forms full color images by mixing colorants in amounts set by corresponding color component values, such as a color laser beam printer or the like, is suitable in the practice of the invention. In this regard, and as mentioned above, "ink" is meant to refer generally to the colorant used by such color printers, and therefore should be understood to refer to "toner" in the case of a color laser beam printer, to "wax" in the case of color thermal printers, and so forth.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 3:
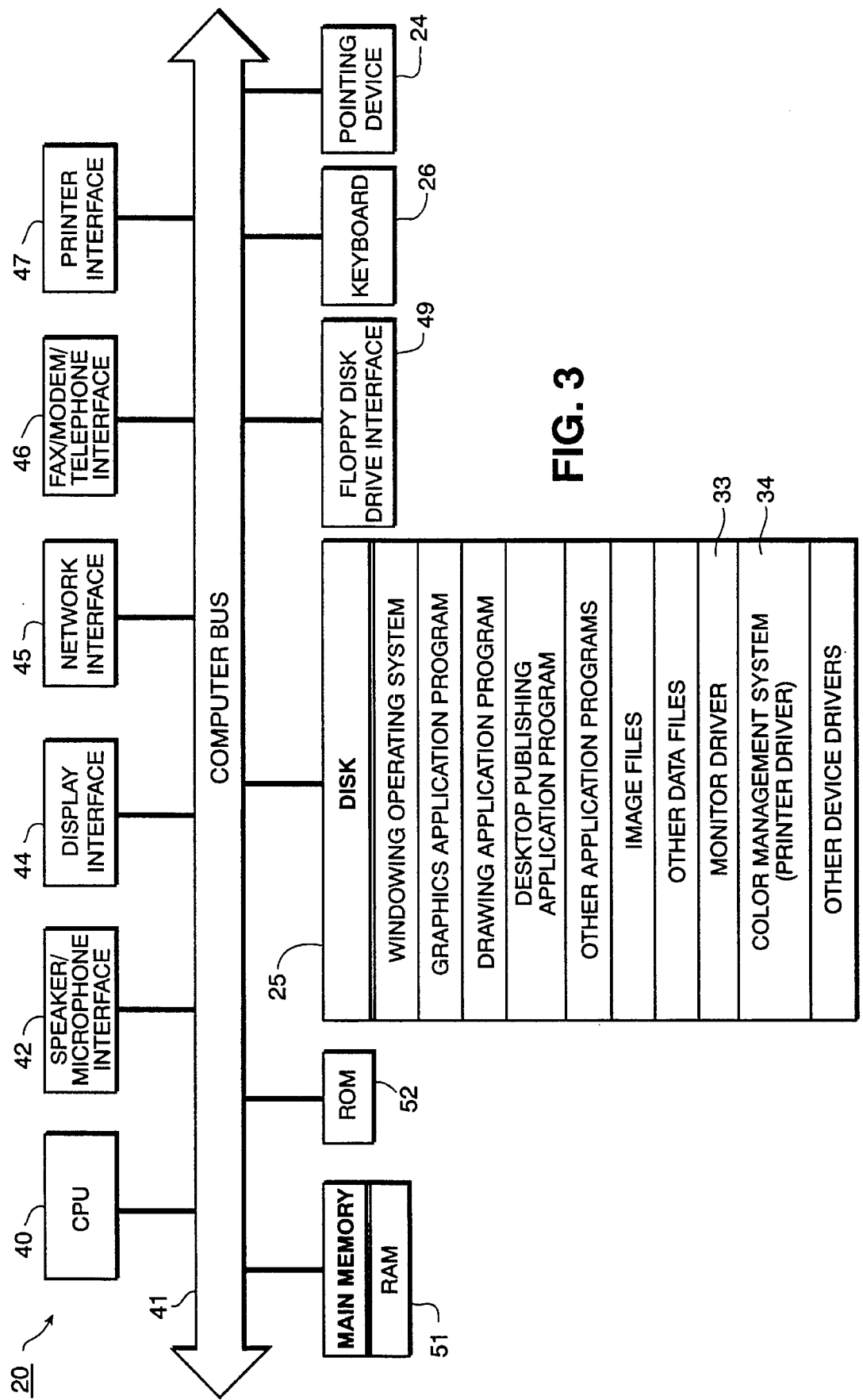
FIG. 3 is a detailed block diagram showing the internal construction of FIG. 2.

FIG. 3 is a detailed block diagram showing the internal construction of computing equipment 20. As shown in FIG. 3, computing equipment 20 includes a central processing unit (CPU) 40 such as programmable microprocessor interfaced to a computer bus 41. Also interfaced to computer bus 41 is speaker/microphone interface 42, display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 3, and as previously mentioned, fixed disk 25 stores program instruction sequences for the windowing operating system and for various application programs such as a graphics application program, a drawing application program, a desktop publishing application program, and the like. In addition, stored on fixed disk 25 are color image files such as are displayed on monitor 23 or printed on printer 30 under control of a designated application program. Fixed disk 25 also stores a monitor driver which controls how RGB color primary values are provided to display interface 44, and color management system 34 which is a printer driver for controlling how CMY color component values are provided to printer interface 47 for printout by printer 30. Other device drivers are also stored on fixed disk 25, for providing appropriate signals to the various devices (such as the speaker and the microphone and the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of color management system 34 is stored. The user would then install color management system 34 onto disk 25 by inserting the purchased floppy disk into floppy disk drive 24 and by commanding CPU 40 to copy color management system 34 from the floppy disk onto disk 25. It is also possible for the user, via telephone 32 and modem interface 46, or via network 31 and network interface 45, to download color management system 34 from a computerized bulletin board to which the drivers had previously been uploaded.

Figure 4:
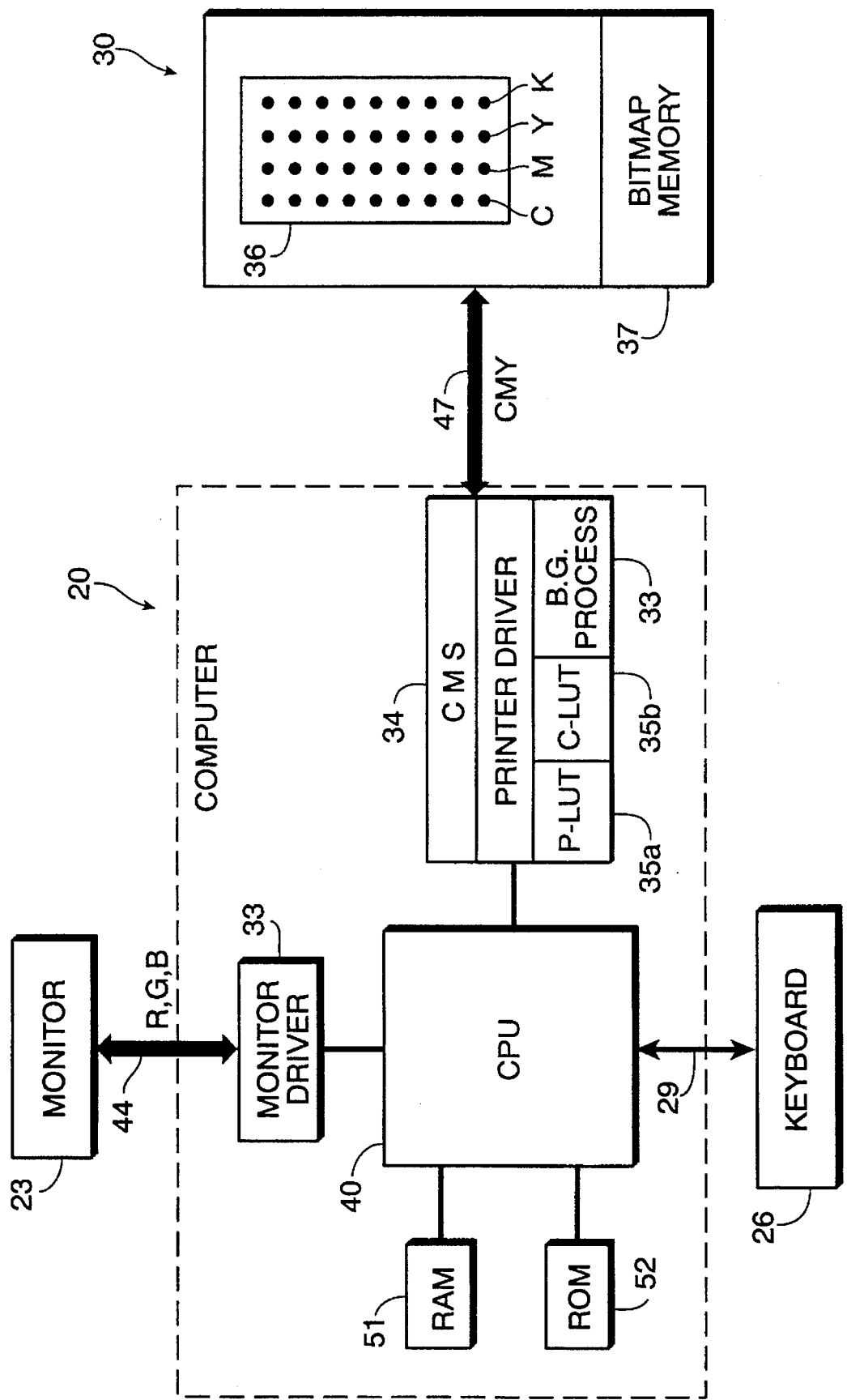
FIG. 4 is a functional block diagram which stresses functional connectivity of the FIG. 3 block diagram.

FIG. 4 is a functional block diagram showing how computer 20 interacts with monitor 23 and printer 30. Shown in FIG. 4 are computer 20 with monitor driver 33, color management system 34, CPU 40, RAM 51 and ROM 52, all arranged functionally rather than in the structural arrangement shown in FIG. 3.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image for display on monitor 23. CPU provides the color image to monitor driver 33 which in turn derives RGB values for each pixel in the monitor 23. The RGB values are provided via display interface 44 to monitor 23 where those values are displayed.

Upon request, CPU 40 also feeds a color image to color management system 34 for printing by color printer 30. Color management system 34 derives CMY values for each pixel of the color image based on the RGB color values provided from CPU 40. The color management system 34 allows selection, ordinarily by the user but in some cases automatically by CPU 40, of one of plural rendering modes, here, a perceptual rendering mode, a colorimetric rendering mode, and a business graphics rendering mode. As described below in more detail in connection with FIG. 5, the perceptual rendering mode and the colorimetric rendering mode are provided with respectively different look-up tables (LUT) 35a and 35b, while business graphics rendering mode is provided with processing steps 33 rather than a look-up table. Whichever one of the plural modes is selected, however, the ultimate purpose of color management system 34 is to provide CMY values which correspond with RGB values provided from CPU 40 and which are printed by printer 30.

Color management system 34 feeds the CMY values via printer interface 46 to printer 30 where they are stored in bitmap memory 37 within printer 30. The CMY values may be altered by printer 30 so as to provide a black (hereinafter "K") value in accordance with standard under color removal ("UCR") or gray component replacement ("GCR") techniques. Alternatively, it is possible for color management system 34 to provide an appropriate K value.

In any event, bitmap memory 37 may store a full bitmap image of the printed image, or it may store only a band or partial bitmap image. When sufficient color data, namely CMYK data, is stored in bitmap memory 37, a color print head 36 reciprocates across a platen adjacent a sheet of paper. In a preferred embodiment, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 5:
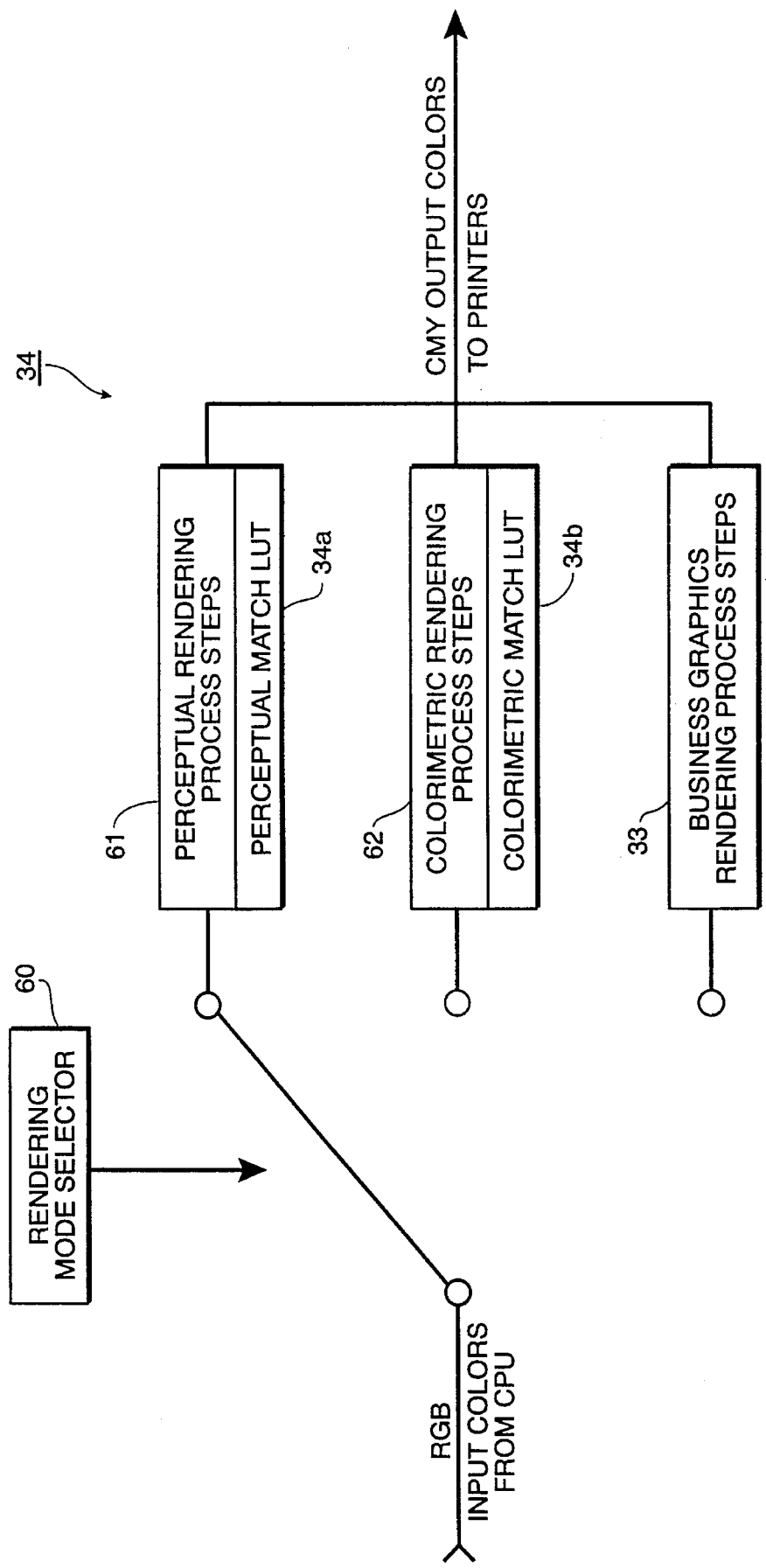
FIG. 5 is a functional view of a color management system according to the invention.

FIG. 5 is a view showing the functional arrangement of color management system 34. The color management system shown in FIG. 5 includes plural different rendering modes, in which at least one rendering mode derives printer ink amounts based on ink amounts stored in a look-up table, and in which at least one other rendering mode derives ink amounts based solely on process steps and without reference to a look-up table of ink amounts. As shown in FIG. 5, color management system 34 includes a rendering mode selector 60 which allows selection between one of plural rendering modes of the color management system. Preferably, rendering mode selector 60 is a user manipulable graphical user interface which allows a user, after commanding an image to be printed, to select one of the plural rendering modes by which color management system 34 is able to render the image. Alternatively, it is also possible for rendering mode selector 60 to be actuatable automatically under control of CPU 40, in which case CPU 40 would make automatic selection of the proper rendering mode. Such automatic selection may, for example, be made based on the type of application software which is generating the image, based on data or image type, based on data structure, based on a histogram or other analysis of color distribution in the image, or the like. For example, all bitmap data might have perceptual rendering automatically selected, while vector graphics might have business graphics rendering automatically selected, and so on.

Based on the mode selected by rendering mode selector 60, RGB input colors from CPU 40 are fed for appropriate processing to the selected one of the plural rendering modes, so as to generate printer colorant values. In the preferred color management system 34 shown here, one of the plural rendering modes is a business graphics rendering mode in which a three-dimensional look-up table, which stores printer colorant values for each of plural RGB input colors, is not necessarily provided, but rather business graphics rendering process steps 33 are provided so as to determine the colorant value that is printed for an input RGB color. On the other hand, in the presently preferred embodiment, the perceptual rendering mode and the colorimetric rendering mode are respectively provided with process steps 61 and 62 which respectively make use of three-dimensional look-up tables 34a and 34b, both of which store printer colorant values for each of plural RGB input colors.

Whichever of the plural modes is selected, the output from each of the modes is CMY ink amounts which is output to printer 30, as mentioned above.

Figure 6:
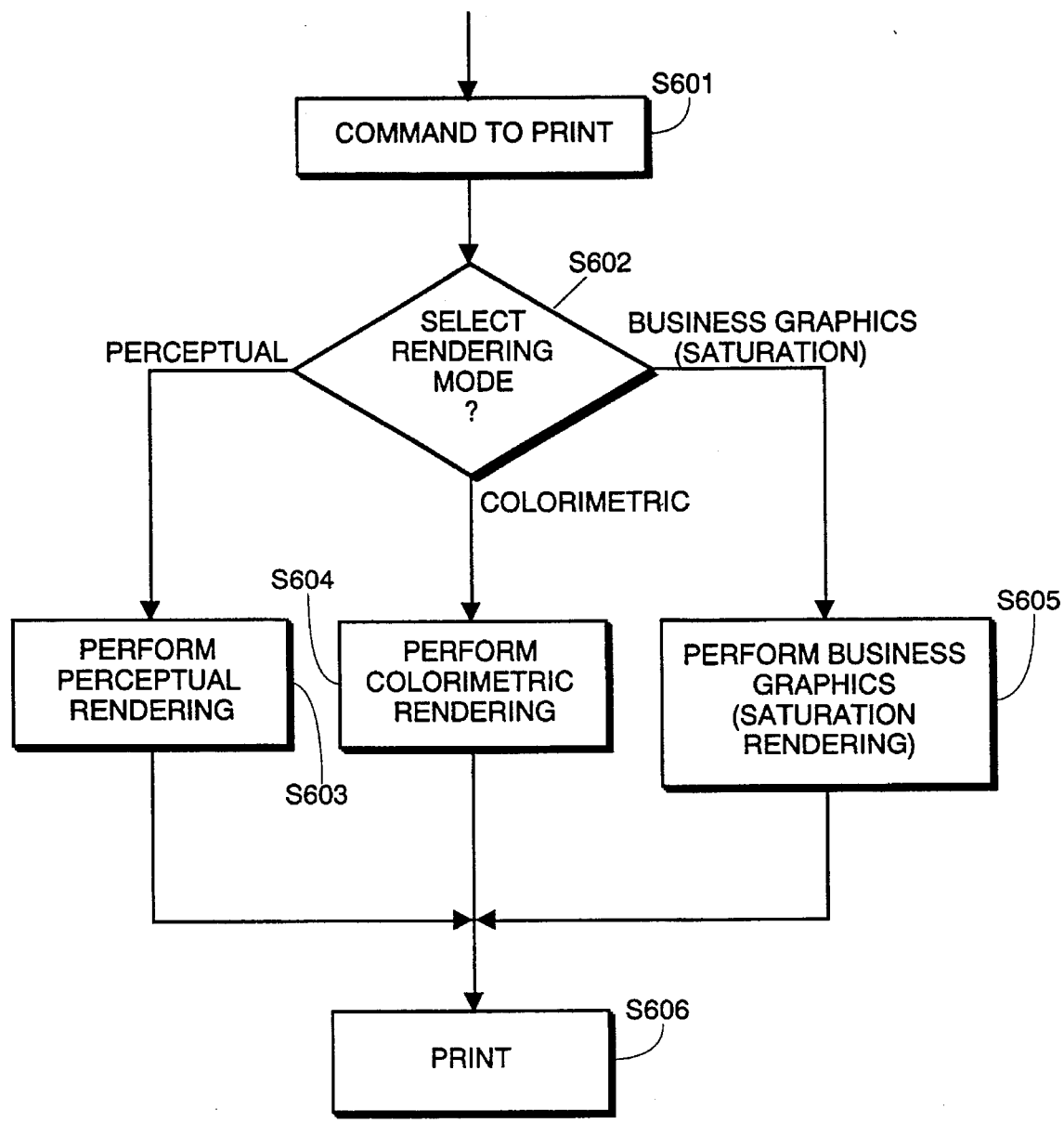
FIG. 6 is a flow diagram showing operation of the color management system.

FIG. 6 is a flow diagram used for explaining operation of color management system 34 shown in FIG. 5.

In step S601, a user issues a command to print. Flow then advances to step S602 in which a rendering mode is selected. Specifically, as mentioned above in connection with FIG. 5, step S602 utilizes rendering mode selector 60 so as to select one of the plural different rendering modes included in color management system 34. Selection can be manual by the user or automatic by computer, although automatic selection with manual override is preferred.

If a perceptual rendering mode is selected in step S602, then flow advances to step S603 in which perceptual rendering is performed in accordance with perceptual rendering process step 61 and perceptual match LUT 34a. Perceptual rendering in accordance with step S603 is described in further detail in connection with FIG. 7. Thereafter, CMY values derived in perceptual rendering step S603 are provided to printer 30 for printing (step S606).

If in step S602 colorimetric rendering is selected, then flow advances to step S604 in which colorimetric rendering is performed in accordance with colorimetric rendering process step 62 and colorimetric match LUT 34b. Colorimetric rendering in accordance with step S604 is described in further detail in connection with FIG. 8. Thereafter, CMY values derived in colorimetric rendering step S604 are provided to printer 30 for printing (step S606).

If in step S602 business graphics rendering is selected, then flow advances to step S605 in which business graphics rendering is performed. Business graphics rendering is performed in accordance with process steps 33 and, unlike perceptual rendering and colorimetric rendering, it is performed without reference to a look-up table. Business graphics rendering is described in further detail below in connection with FIG. 9. Thereafter, CMY values derived in business graphics rendering step S605 are provided to printer 30 for printing (step S606).

Figure 7:
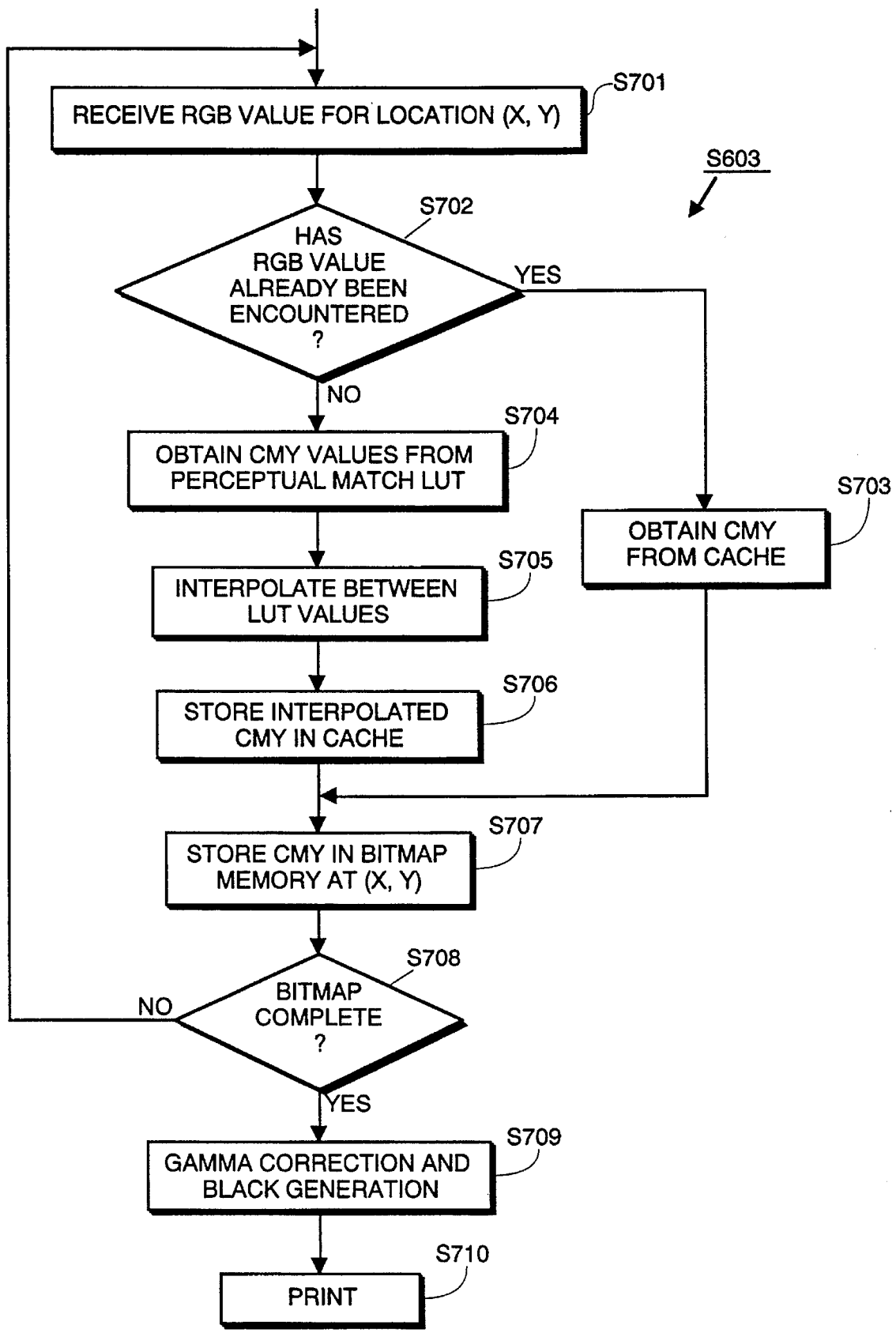
FIG. 7 is a flow diagram showing perceptual rendering according to the color management system of FIG. 6.

FIG. 7 is a flow diagram for explaining perceptual rendering process steps 61 which are performed when, in step S602, rendering mode selector 60 selects perceptual rendering in accordance with step S603.

Referring specifically to FIG. 7, in step S701 color management system 34 receives RGB values for a location (x,y) in bitmap memory 37. In step S702, color management system 34 determines whether the specific RGB value received in step S701 has already been encountered at, for example, another portion of the image begin printed. The reason for this check is because too much memory would be wasted if perceptual match LUT 34a were to store a CMY value for each and every RGB value ever to be encountered. For example if RGB values ranged from 0 to 255, then 256×256×256=16,277,216 CMY values would need to be stored, and even with 16,277,216 stored values only integral values of RGB would be accommodated, not fractional values. Accordingly, it is conventional to store a look-up table which stores only a subset of possible RGB values and to apply interpolation between close RGB values in order to obtain a CMY value for one particular desired RGB value. However, since interpolation is mathematically time-consuming, it is also conventional to store the interpolated value in a small-size cache, once the interpolated value has been computed, so that in case the particular RGB value is again encountered, the previously-stored CMY value in the cache can be used instead of again performing interpolation. Accordingly, in step S702, if the RGB value has already been encountered, then flow branches to step S703 in which the needed CMY value for the already-encountered RGB value is obtained from cache memory, whereafter flow skips to step S707.

On the other hand, if step S702 determines that the RGB value has not already been encountered, then flow advances to step S704 which looks up corresponding CMY values stored in perceptual match LUT 34a in correspondence to the RGB value received in step S701. Several such values are obtained, each of the values corresponding to a close RGB value for which a LUT entry is available. In step S705, interpolation is performed so as to obtain an interpolated CMY value for the usual case in which there is no exact entry in perceptual match LUT 34a for the received RGB value. Appropriate interpolation techniques are well known to those skilled in the art and include, for example trilinear interpolation and tetrahedral interpolation.

In step S706, the interpolated CMY value is stored in the cache so that it is available for use should the RGB value received in step S701 ever be encountered again during printout of the color image (as explained above in connection with step S703).

In step S707, the CMY value corresponding to the received RGB value, whether that CMY value is obtained by interpolation in step S706 or obtained from the cache in step S703, is stored in bitmap memory 37 at location (x,y). If desired, the CMY value may be modified before storage, for example, by appropriate undercolor removal ("UCR") or gray component replacement ("GCR") techniques so as to obtain a black (K) value.

In step S708, color management system 34 determines whether the bitmap memory has been completed, or if at least a needed part or band of bitmap memory 37 has been completed. If the bitmap memory has not been completed, then flow returns to step S701 in which the next RGB value is received for the next location (x,y) in bitmap memory. On the other hand, if the bitmap memory has been completed, or if a sufficient area of the bitmap memory has been completed (such as an eight row long band corresponding to the eight rows of ink jet nozzles in head 36), then flow advances to step S709 where any needed post-processing is performed, such as gamma correction or (if not already performed) black generation. Then, in step S710, color printing is initiated using the CMY (and, if appropriate, K) values stored in bitmap memory 37.

Figure 8:
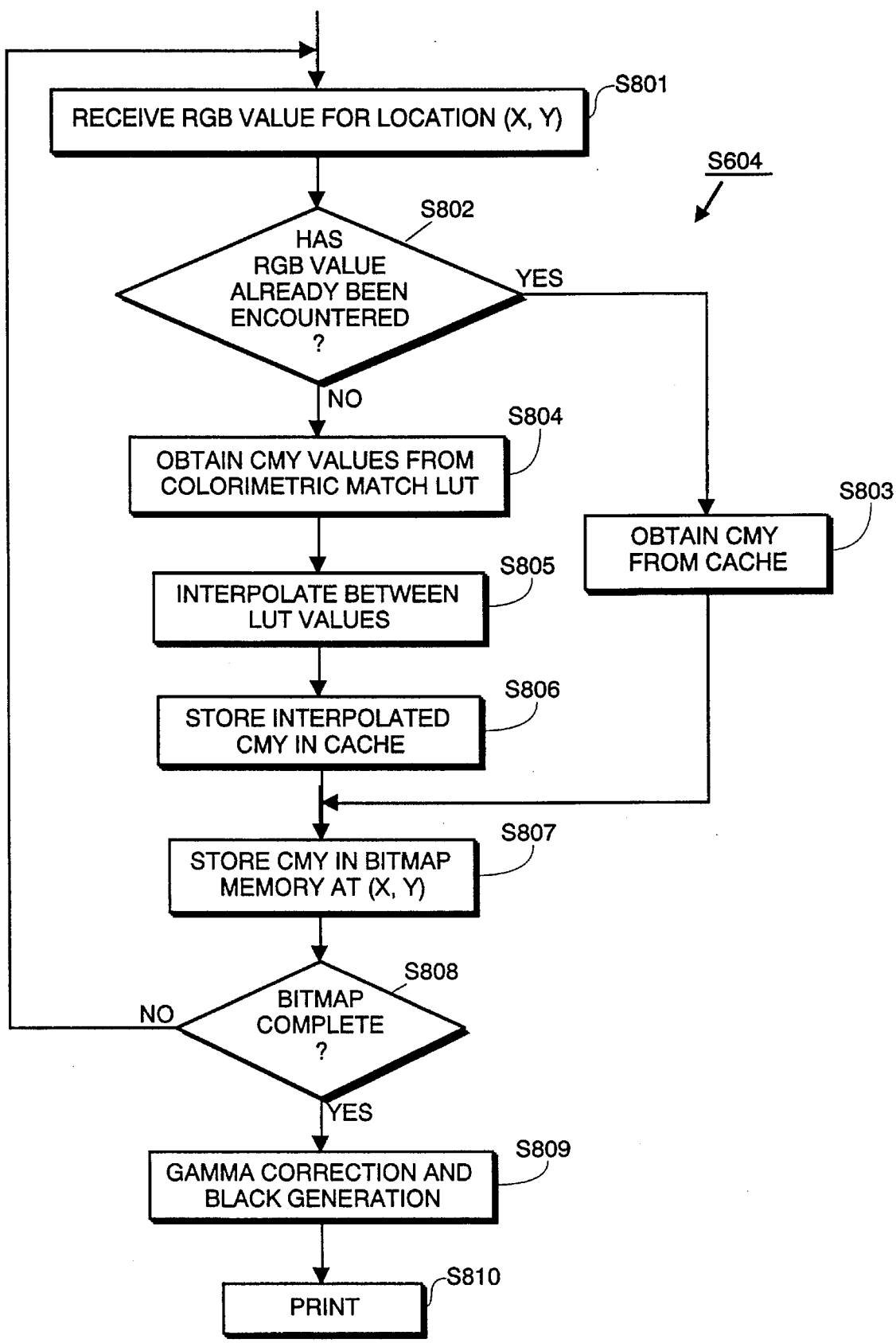
FIG. 8 is a flow diagram showing colorimetric rendering according to the flow diagram of FIG. 6.

FIG. 8 is a flow diagram for explaining colorimetric rendering process steps 61 which are performed when, in step S602, rendering mode selector 60 selects colorimetric rendering in accordance with step S604.

While other arrangements are possible, in this embodiment the process steps in FIG. 8 are identical to those in FIG. 7, except that colorimetric match LUT 34b is used instead of perceptual match LUT 34a. Thus, in step S801 color management system 34 receives an RGB value for a location (x,y) in bitmap memory 37, and in step S802, the color management system determines whether the received RGB value has already been encountered. If the RGB value has already been encountered, then an appropriate CMY value is obtained from a cache memory in step S803, whereas if the RGB value has not already been encountered, then flow advances to step S804 which obtains CMY values stored in colorimetric match LUT 34b, step S805 which interpolates between the LUT values, and step S806 in which the interpolated CMY value is stored in the cache memory. Step S807 stores the CMY value corresponding to the received RGB value in bitmap memory at location (x,y), step S808 determines whether the bitmap memory is complete, step S809 performs post-processing such as gamma correction and black generation, and step S810 initiates print.

Figure 9:
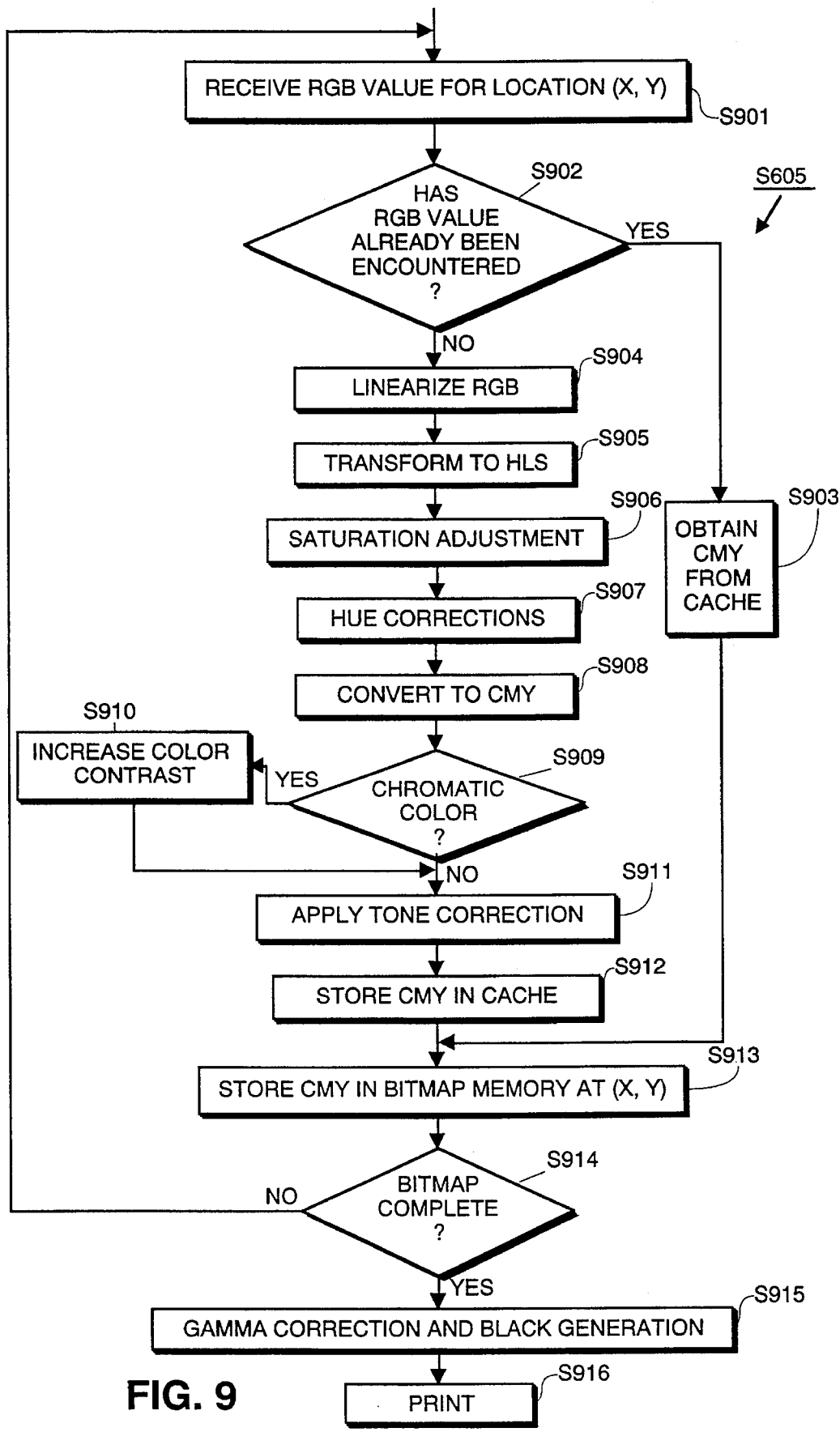
FIG. 9 is a flow diagram showing business graphics rendering according to the flow diagram of FIG. 6.

FIG. 9 is a flow diagram for explaining business graphics rendering process steps 62 which are performed when, in step S602, rendering mode selector 60 selects business graphics rendering in accordance with step S605.

Unlike the process steps shown in FIGS. 7 and 8, for perceptual and colorimetric color rendering techniques, the process steps shown in FIG. 9 for business graphics rendering are preferably performed without use of a three-dimensional look-up table for obtaining CMY ink amounts corresponding to RGB input colors. The reason for this is to reduce the amount of memory needed for color management system 34 relative to a situation in which a three-dimensional look-up table were used for business graphics rendering. Ordinarily, a look-up table speeds color rendering processing because the only calculations needed are interpolation calculations between LUT values. Thus, complicated, repetitive and time-consuming calculations to obtain the LUT values are avoided. Therefore, in a typical perceptual or colorimetric rendering situation in which hundreds or even thousands of different colors may be needed to render the entire image, use of a look-up table speeds rendering-processing. On the other hand, with a typical business graphics rendering situation, only a few colors are needed in order to render the entire image. For example, with a seven color pie chart, only seven colors are ordinarily needed to render the entire image. Therefore, with a typical business graphics rendering situation, there is ordinarily no time penalty if a look-up table is not used (since only a few colors need to be calculated) and, at the same time, there is often a significant memory conservation payoff.

Thus, the process steps shown in FIG. 9 do not necessarily rely for their successful completion on the presence of a look-up table for CMY ink amounts. Overall, these process steps provide for a business graphics rendering technique which obtains printer ink amounts for each RGB color in a color image containing plural such RGB colors, by first converting each RGB color into HLS coordinates so as to obtain a saturation value for the RGB color, by next converting the HLS coordinates into printer ink amounts, and by determining, based on the saturation value obtained in the first conversion whether the RGB color is a chromatic color or an achromatic neutral color. For chromatic colors, color contrast of the overall image is increased by increasing ink amounts for high value ink amounts and/or decreasing ink amounts for low value ink amounts. On the other hand, for achromatic neutral colors, ink amounts are left essentially unaltered. By virtue of such processing, overall color contrast for business graphics is increased yielding a bright, vivid and pleasing business graphics output.

Specifically, in step S901, color management system 34 receives an RGB value for a location (x,y) in bitmap memory 37. Step S902 determines whether the RGB value received in step S901 has already been encountered. If the RGB value has already been encountered, then flow branches to step S903 which obtains the needed CMY value from a cache memory thereby avoiding, as described above, the need to calculate a CMY value for all RGB values for which CMY values have already been calculated. Flow then skips to step S913.

On the other hand, if the RGB value received in step S901 has not already been encountered, flow advances to step S904 in which the RGB value is linearized. RGB linearization in step S904 includes a transformation used to compensate for gamma of monitor 23. Gamma of monitor 23 is applied in a transformation in step S904 such that resulting RGBs are linear with respect to lightness.

Flow then advances to step S905 in which the linearized RGB values are transformed to HLS space. While any of the various well-known transformations are suitable for step S905, preferably a standard transformation used in computer-generated graphics is used. A suitable transformation is given by J. Foley, et al., "Computer Graphics, Principles And Practice", Addison-Wesley, 1990.

Flow then advances to step S906 in which the HLS values obtained from step S905 are adjusted for saturation. Saturation adjustment according to the invention is preferably applied only to the "S" value of the HLS coordinates obtained in step S905. Presently, a cubic function with a starting slope of greater than one at S=0 and an ending slope less than one at S=1 is preferred. A suitable cubic function is:

$$s=(1/6)S^3-(2/3)S^2+(3/2)S$$

If the foregoing cubic function for S yields a value for S which is less than zero, then S is set to zero, whereas if the foregoing equation for S yields a value of S greater than one, then S is set to one. With such processing, saturation is adjusted so that it lies in the range zero to one.

Flow then advances to step S907 in which hue corrections are applied. The hue corrections applied in step S907 are designed to compensate for impurities found in some inks, particularly cyan and magenta inks. For example, cyan ink may have some unwanted cyan absorption which makes a mixture of cyan and magenta appear purplish rather than blue. Any suitable hue correction technique can be applied in step S907 so as to compensate for ink impurities, but it is presently preferred to use the hue angle warping technique described in Ser. No. 07/967,050, "Color Printing Method And Apparatus Which Compensates For Abney Effect", which is assigned to the same assignee as the present invention.

Flow then advances to step S908 for conversion of the hue-corrected HLS color to CMY ink amounts. Any suitable transformation from HLS to CMY may be used. A suitable transformation involves a transformation from HLS to RGB, as defined in the foregoing J. Foley book, followed by a simple inversion from RGB to CMY. The resultant CMY values are normalized between zero and one, and then converted to CMY ink amounts by multiplication by a suitable value, such as 256.

Steps S909 and S910 determine whether the CMY color in step S908 is a chromatic color or an achromatic neutral color, and, for chromatic colors, these steps increase color contrast while, for achromatic neutral colors, leave contrast essentially unaltered.

Thus, in step S909 the CMY ink amounts derived in step S908 are inspected to determine whether they correspond to a chromatic color. In the preferred embodiment of the invention, this determination is made through reference to the S value obtained from step S906 for the color in HLS coordinates. If that S value is equal to zero, or if that S value is smaller than some predetermined small threshold, then step S909 determines that the CMY ink amounts obtained in step S908 correspond to an achromatic neutral color rather than to a chromatic color. On the other hand, if the S value obtained in step S906 is not equal to zero, or if it is greater than the predetermined small threshold, then step S909 determines that the CMY ink amounts obtained in step S908 correspond to a chromatic color.

While in the preferred embodiment step S909 determines whether the CMY ink amounts correspond to a chromatic color through reference to the S value in HLS coordinates, as described above, other arrangements are also possible. For example, it is possible for step S909 to determine whether the CMY ink amounts correspond to a chromatic color by comparing the CMY ink amounts: if the ratio of C to M to Y ink amounts is equal or approximately equal to a predetermined ratio which yields a neutral color (the predetermined ratio is unlikely to be 1:1:1 because of the above-noted ink impurities), then step S909 can determine that the CMY ink amounts correspond to an achromatic neutral color.

In any event, if step S909 determines that the CMY ink amounts from step S908 correspond to a chromatic color and not to an achromatic neutral color, then flow branches to step S910 which increases color contrast by, for each of the CMY ink amounts, increasing ink amounts for high value ink amounts and/or decreasing ink amounts for low value ink amounts. Preferably, each of the CMY ink amounts is adjusted independently of the other ink amounts, that is, the increase and/or decrease of a C ink amount depends only on the value of the C ink amount and not on the value of the M and Y ink amounts. Suitable implementations for this are described below in connection with FIGS. 10(a) through 10(e). Other arrangements are possible but they are less preferred in that they depend, for the adjustment of one ink amount, on the values of the other ink amounts.

After increasing color contrast in step S910, flow then advances to step S911, which is discussed below.

If, on the other hand, step S909 determines that the CMY ink amounts obtained in step S908 correspond to an achromatic neutral color, flow advances directly to step S911 without modifying the ink amounts. Since ink amounts are not modified, this processing leaves ink amounts and the contrast of achromatic neutral colors essentially unaltered. As mentioned previously, leaving contrast of achromatic neutral colors essentially unaltered provides the advantageous benefit that gray-scale images are reproduced without undesirable blackening of dark gray portions and without undesirable whitening of light gray portions.

In step S911, color management system 34 applies tone correction to the CMY ink amounts so as to correct for the difference between the zero to 255 digital count values of the printer and the visual representation of a tone scale printed on paper. Preferably, tone correction is implemented as three (or four if a black component has been calculated) one dimensional arrays which provide the best overall tone reproduction for the printer. Thus, the tone correction applied in step S911 is essentially a gamma correction. All other brightness, intensity, or contrast adjustments may be applied so as to adjust for an individual user's preferences.

Flow then advances to step S912 in which the tone-corrected CMY ink amounts obtained from step S911 are stored in the cache memory. As mentioned above, the CMY ink amounts are stored in cache memory so that if step S901 ever again receives the same RGB value, then the CMY value can be obtained directly from cache memory in step S903 and the processing steps described above in connection with steps S904 through S912 can be avoided altogether.

Flow then advances to step S913 in which the CMY ink amounts are stored in bitmap memory 37 at location (x,y). In step S914, color management system 34 determines whether the bitmap memory has been completed, of if at least a needed part or band of bitmap memory 37 has been completed. If the bitmap memory has not yet been completed, then flow returns to step S901 in which the next RGB value is received for the next location (x,y) in bitmap memory. On the other hand, if the bitmap memory has been completed, or if at least a sufficient area of the bitmap memory has been completed (such as an eight row long band corresponding to the eight rows of ink jet nozzles in head 36), then flow advances to step S915 in which post-processing is performed for the CMY ink amounts, such as by gamma correction and black generation. Flow then advances to step S916 in which the ink amounts stored in bitmap memory are printed.

FIGS. 10(a) through 10(e) are graphs for explaining how step S910 increases color contrast for chromatic colors by increasing ink amounts for high value ink amounts and/or decreasing ink amounts for low value ink amounts. Each of FIGS. 10(a) through 10(e) includes a solid line curve 70 which will take an input ink amount given along the horizontal axis of the graph and yield an output ink amount given along the vertical axis of the graph. Each of FIGS. 10(a) through 10(e) also includes a dashed line 71 for which input and output ink amounts are equal; dashed line 71 is provided for reference purposes only, so as to emphasize the difference between unmodified ink amounts and modified ink amounts shown in solid line 70. In addition, while curves are shown in FIGS. 10(a) through 10(e), it is preferred in an actual implementation to pre-store values corresponding to the curve, such as in a computer-readable array.

Figure 10A:
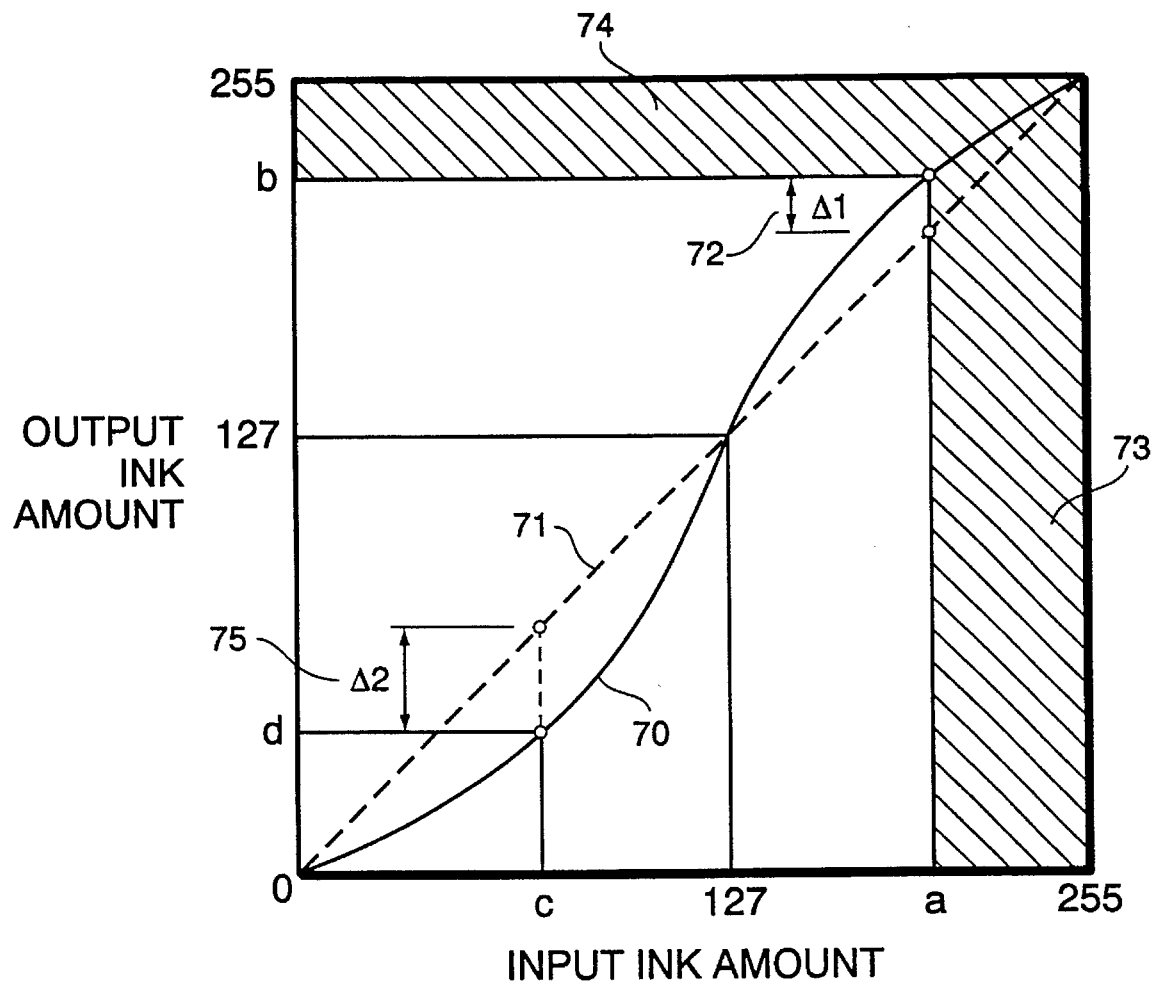
FIGS. 10(a), 10(b), 10(c), 10(d) and 10(e) are graphs showing how to increase and/or decrease ink amounts in order to increase color contrast in the business graphics rendering mode.

FIG. 10(a) shows one preferred curve 70 which increases color contrast by both increasing ink amounts for high value ink amounts and also by decreasing ink amounts for low value ink amounts. Thus, curve 70 in FIG. 10(a) is an elongate S-shaped curve which gives an output ink amount for any input ink amount. As mentioned above in connection with step S910, it is preferred to modify the ink amount for each individual C, M and Y color component independently of the CMY color components, for example, to modify the C ink amount independently of the M and Y ink amounts. Thus, it will be understood that curve 70 is applied to each individual C, M and Y colorant, and the same is true of curve 70 in FIGS. 10(b) through 10(e).

FIG. 10(a) illustrates how an arbitrary high value input ink amount "a" is increased to a higher value output ink amount "b" which is subsequently used for printing and increased color contrast image. Specifically, from an input ink amount "a", an output ink amount "b" is obtained using curve 70. The increase in ink amount is shown at 72 by $\Delta 1$ which is the difference between where ink amount "a" intersects curves 70 and 71. Thus, $\Delta 1$ is the increase in ink amount for high value ink amount "a". It will be appreciated that any high-valued ink amount in cross-hatched region 73 will have its ink amount increased by curve 70 such that output ink amounts for input ink amounts in region 73 are given in region 74.

Similarly, for low-valued input ink amount "c", the output ink amount is decreased to output ink amount "d". The decrease in ink amount is shown at 75 by $\Delta 2$. Thus, it will be appreciated that curve 70 decreases ink amounts for relatively low-valued input ink amounts.

Figure 10B:
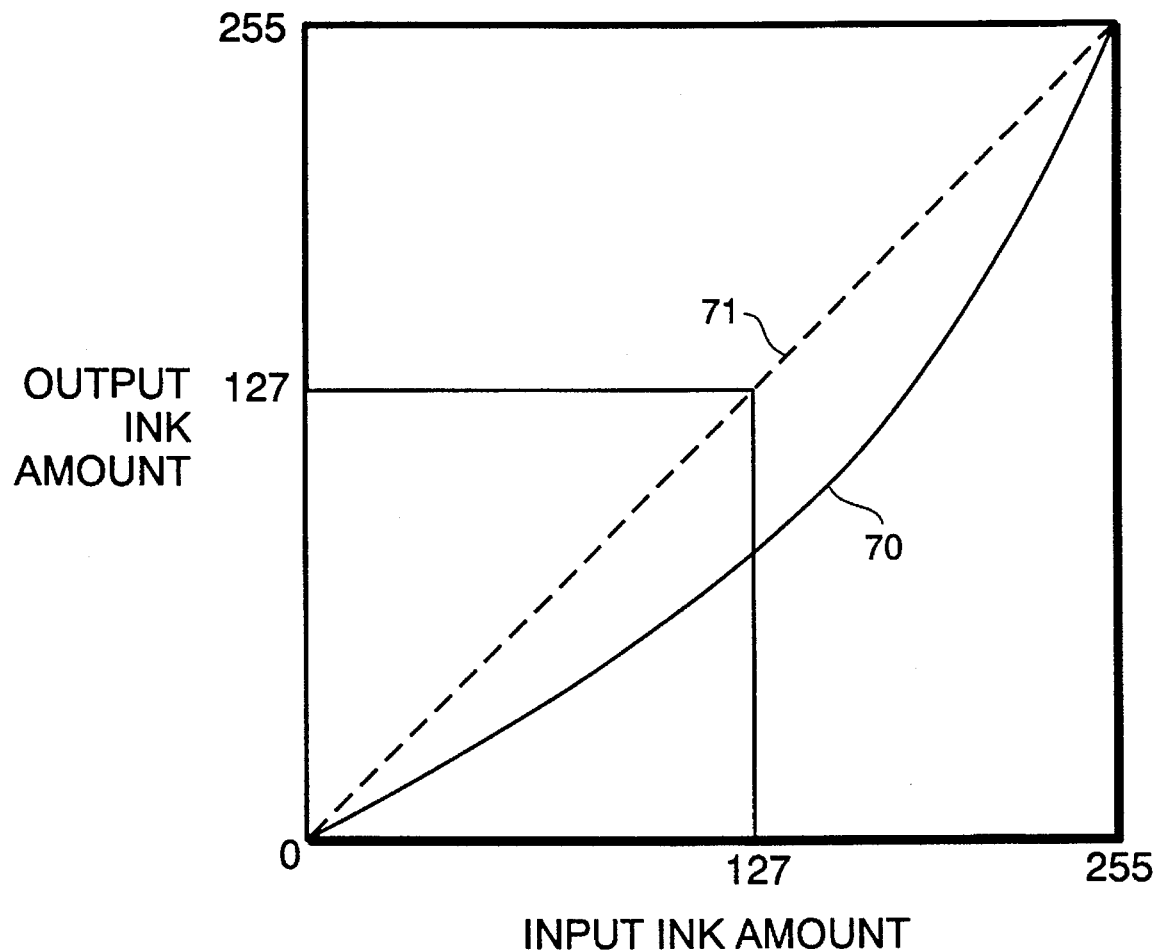
Figure 10C:
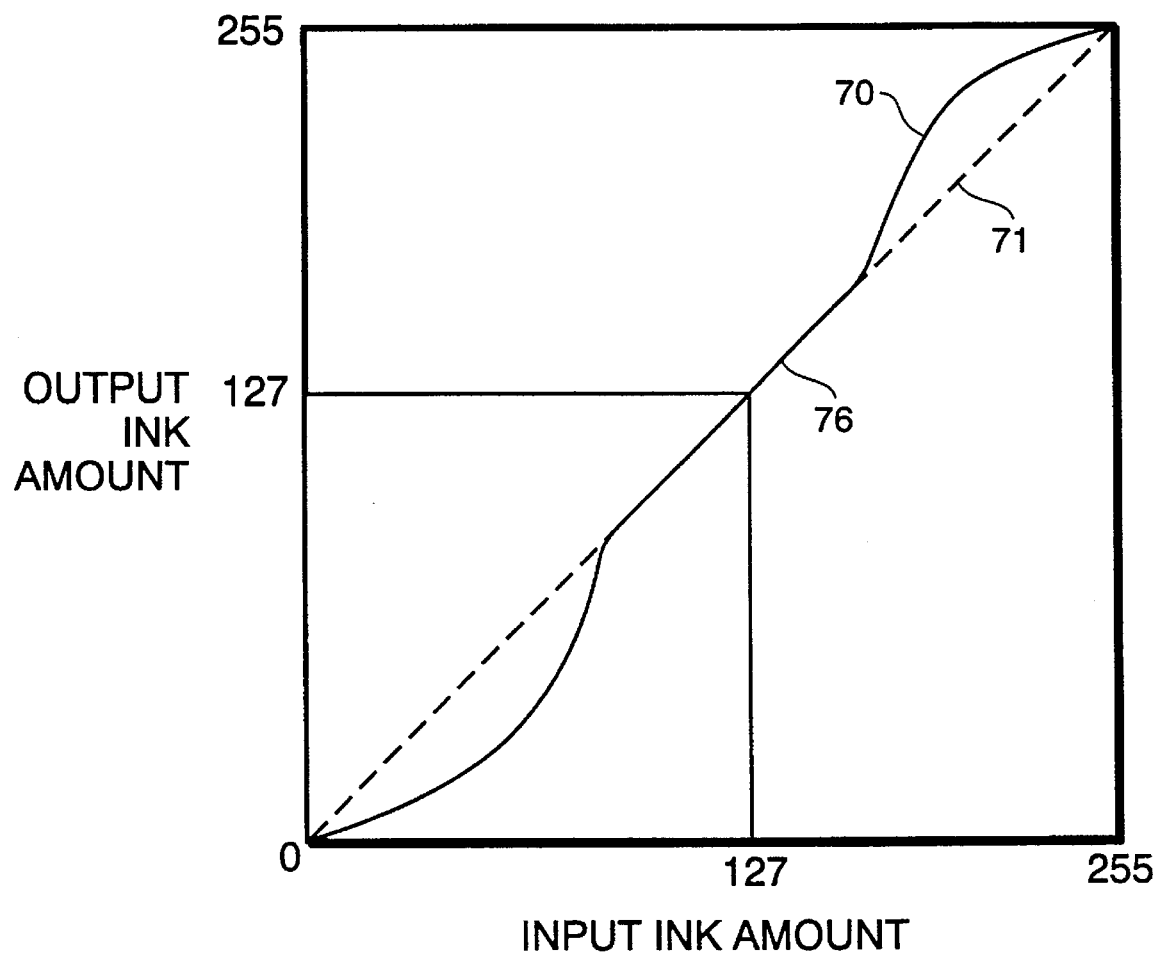
Figure 10D:
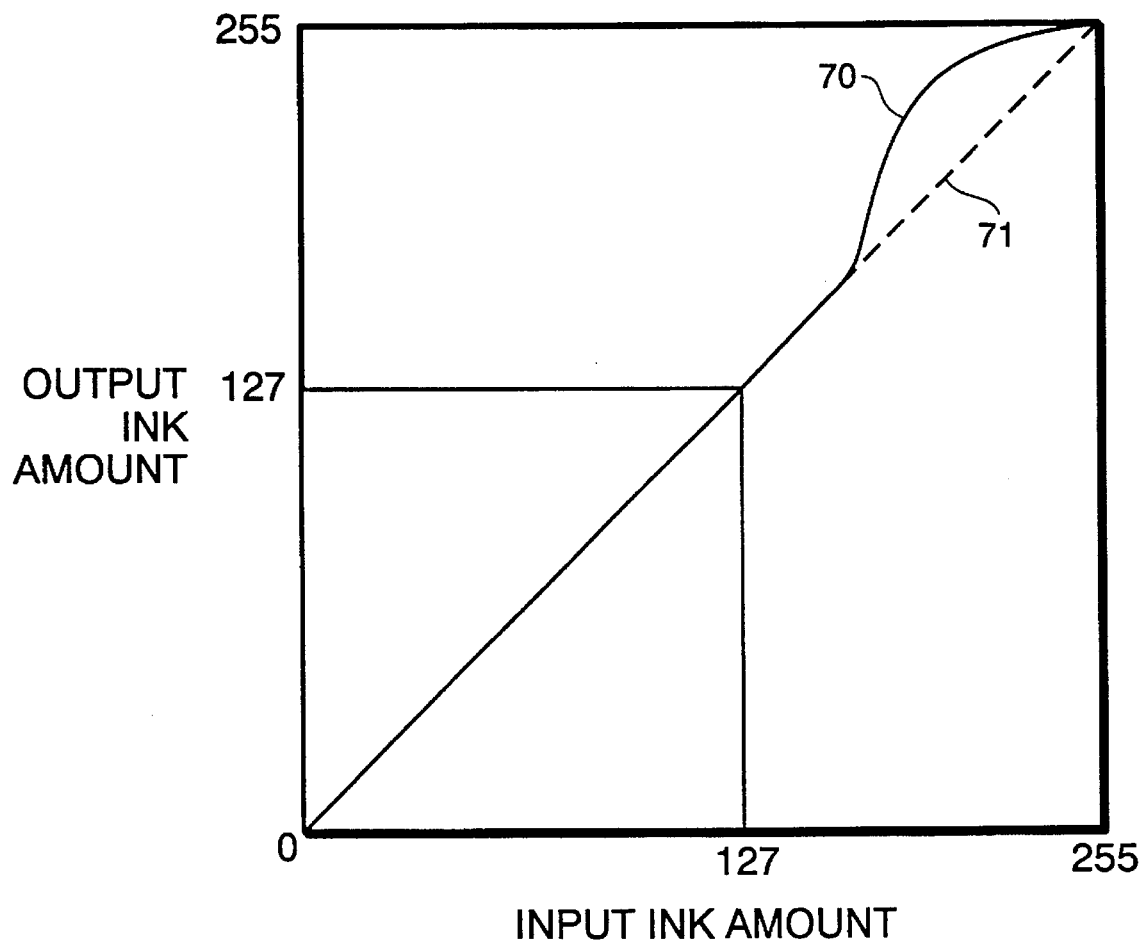
Figure 10E:
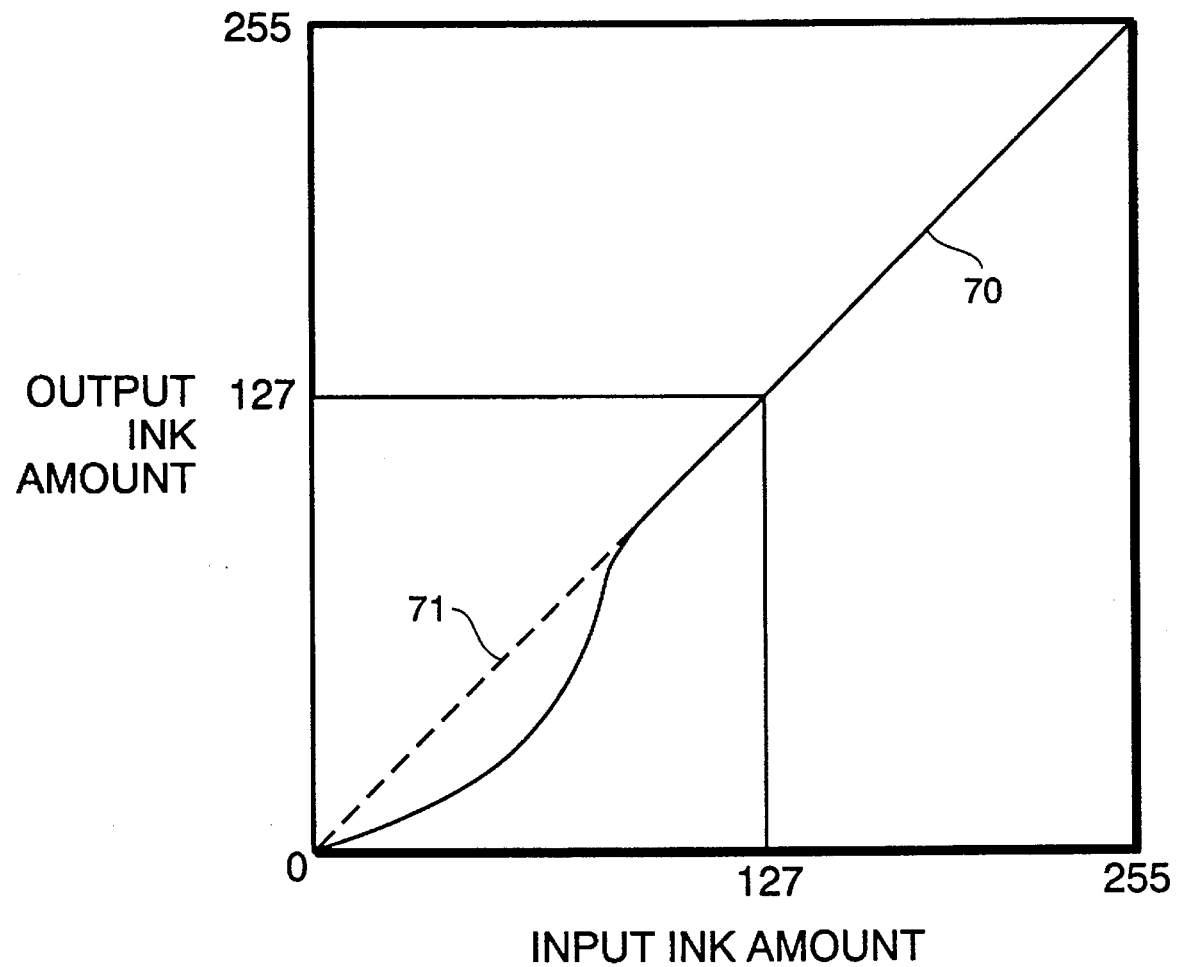

FIG. 10(b) shows a curve 70 which decreases all ink amounts (except ink amounts at identically 0 and 255), thereby to increase color contrast. One difference between curve 70 shown in FIG. 10(*b*) and curve 70 of FIG. 10(*a*) is that curve 70 of FIG. 10(*b*) reduces all ink amounts, whereas curve 70 of FIG. 10(*a*) decreases some ink amounts and increases others. Curve 70 of FIG. 10(*b*) therefore provides an overall lightening effect of the image, in addition to an increased color contrast. This lightening effect is particularly desirable in color printers using bubble jet technology because of the halftoning process used. In very saturated primary colors such as red, (100% yellow and 100% magenta) the saturation is greatly affected by even small cyan ink values. Without the FIG. 10(*b*) curve, a business graphic color like R=235, B=20, G=20, (on screen, a light red) would yield a printed color like C=20, M=235, Y=235. This is an unsaturated red color because of tiny halftone dots of cyan, caused by C=20, which print in the red areas. The curve 70 in FIG. 10(*b*) lightens the very light dots to remove stray cyan dots, effectively reducing C=20 down to C=0. The steepness of curve 70 also yields more color contrast, as does any curve with a slope greater than 1. Moreover, since curve 70 in FIG. 10(*b*) reduces all ink amounts, the curve tends to lighten the overall image and increase the ability of viewers to distinguish between different colors. Thus, curve 70 in FIG. 10(*b*) is particularly preferred in the case of bubble jet printers.

FIG. 10(*c*) shows a curve 70 which, like FIG. 10(*a*), both increases ink amounts for high-valued ink amounts and decreases ink amounts for low-valued ink amounts, thereby to increase color contrast. One difference between the curve shown in FIG. 10(*a*) and 10(*c*) is that in FIG. 10(*c*) only very high ink amount values are increased and only very low ink amount values are decreased, while in middle region 76, ink amounts are left essentially unaltered.

FIG. 10(*d*) shows a curve 70 which increases only high-valued ink amounts and does not change any other ink amounts, thereby to increase color contrast. Thus, in curve 70 shown in FIG. 10(*d*), low valued ink amounts are not changed.

FIG. 10(*e*) shows a curve 70 in which only low valued ink amounts are decreased while high-valued ink amounts are left unaltered, thereby to increase color contrast. Thus, in FIG. 10(*e*), high-valued ink amounts are not changed.

Thus, it will be appreciated that a color management system has been described in which, among plural rendering modes, a business graphics rendering mode is available which increases overall color contrasts by determining whether a CMY ink amount corresponds to a chromatic color an achromatic neutral color, for chromatic colors increasing contrast by increasing ink amounts for high value ink amounts and/or decreasing ink amounts for low-valued ink amounts, and for achromatic neutral colors leaving ink amounts unaltered.

The invention has been described with respect to a particular illustrative embodiment. It is to be understood that the invention is not limited to the above described embodiment and that various changes and modifications may be made by those of ordinary skill in the art without departing from the spirit and scope of the appended claims.

What is claimed is:

1. A business graphics rendering technique for rendering colors in a color image more vividly, comprising the steps of:

determining, for each color of plural colors, whether the color is a chromatic color or an achromatic neutral color;

for a chromatic color, increasing color contrast by increasing ink amounts for high-value ink amount colors and/or decreasing ink amounts for low-value ink amount colors; and for an achromatic neutral color, leaving ink amounts essentially unaltered.

2. A business graphics rendering technique according to claim 1, wherein said determining step determines whether each color of the plural colors is a chromatic color or an achromatic neutral color by reference to a saturation value of the color in HLS space.

3. A business graphics rendering technique according to claim 1, wherein said determining step determines whether each color of the plural colors is a chromatic color or an achromatic neutral color by comparison of each of plural ink amounts of the color to determine whether the ink amounts yield a visually neutral color.

4. A business graphics rendering technique according to claim 1, wherein for chromatic colors, ink amounts are altered independently of values of other ink amounts.

5. A business graphics rendering technique according to claim 4, wherein ink amounts are altered based on an S-shaped curve.

6. A business graphics rendering technique according to claim 4, wherein each ink amount is reduced.

7. A business graphics rendering technique for rendering colors in a color image more vividly, comprising the steps of:

determining, for each color of plural colors, whether the color is a chromatic color or an achromatic neutral color;

for a chromatic color, increasing color contrast by increasing ink amounts for high-value ink amount colors and by decreasing ink amounts for low-value ink amount colors; and for an achromatic neutral color, leaving ink amounts essentially unaltered.

8. A business graphics rendering technique according to claim 7, wherein said determining step determines whether each color of the plural colors is a chromatic color or an achromatic neutral color by reference to a saturation value of the color in HLS space.

9. A business graphics rendering technique according to claim 7, wherein said determining step determines whether each color of the plural colors is a chromatic color or an achromatic neutral color by comparison of each of plural ink amounts of the color to determine whether the ink amounts yield a visually neutral color.

10. A business graphics rendering technique according to claim 7, wherein for chromatic colors, ink amounts are altered independently of values of other ink amounts.

11. A business graphics rendering technique according to claim 10, wherein ink amounts are altered based on an S-shaped curve.

12. A business graphics rendering technique according to claim 10, wherein each ink amount is reduced.

13. A business graphics rendering technique for obtaining printer colorant values for each RGB color in a color image containing plural such RGB colors, comprising the steps of:

a first converting step of converting each RGB color into HLS coordinates so as to obtain a saturation value for the RGB color;

a second converting step of converting the HLS coordinates into printer colorant values;

determining, based on the saturation value obtained in said first converting step, whether the RGB color is a chromatic color or an achromatic neutral color;

for a chromatic color, increasing color contrast by increasing colorant amount of high-valued printer colorant values and/or decreasing colorant amounts of low-valued printer colorant values; and for an achromatic neutral color, leaving printer colorant amounts essentially unaltered.

14. A business graphics rendering technique according to claim 13, wherein for chromatic colors, colorant amounts are altered independently of values of other colorant amounts.

15. A business graphics rendering technique according to claim 14, wherein colorant amounts are altered based on an S-shaped curve.

16. A business graphics rendering technique according to claim 14, where each colorant amount is reduced.

17. A color management system having plural selectable rendering modes, one of the plural rendering modes being selected so as to render a color image, said color management system comprising:

a first rendering mode which includes first process steps and a look-up table, the look-up table storing printer colorant values for each of plural colors, wherein the process steps include steps to interpolate between look-up table values so as to derive printer colorant values corresponding to an input color;

a second color rendering mode which includes second process steps to derive printer colorant values for an input color without reference to a look-up table which stores plural such printer colorant values for each of plural colors; and a selector for selecting one of the plural rendering modes which include said first mode and said second mode.

18. A color management system according to claim 17, wherein each of the first and second process steps include process steps for storing, in a cache, printer colorant values for input colors previously encountered.

19. A color management system according to claim 17, wherein said second mode is comprised by a business graphics rendering mode which renders input colors with increased overall color contrast.

20. A color management system according to claim 19, wherein in said business graphics rendering modes, for chromatic colors, high-valued printer colorant amounts are increased, and/or low-valued printer colorant amounts are decreased.

21. A color management system according to claim 19, wherein in said business graphics rendering mode, for achromatic neutral colors, printer colorant amounts are left unaltered.

22. A color management system according to claim 17, wherein said first mode is comprised by one of a perceptual rendering mode and a colorimetric rendering mode, and wherein said second mode is comprised by a business graphics rendering mode.

* * * * *